June 1, 1926.

H. L. TANNER

ELECTRICAL INDICATOR

Filed April 13, 1922

Inventor
HARRY L. TANNER.
By his Attorney
Herbert H. Thompson

June 1, 1926.
H. L. TANNER
1,587,050
ELECTRICAL INDICATOR
Filed April 13, 1922    2 Sheets-Sheet 2
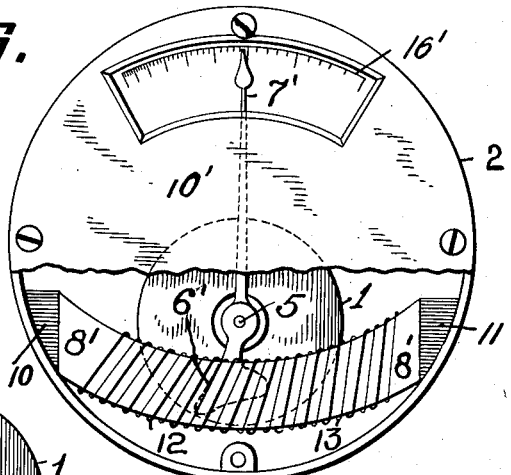
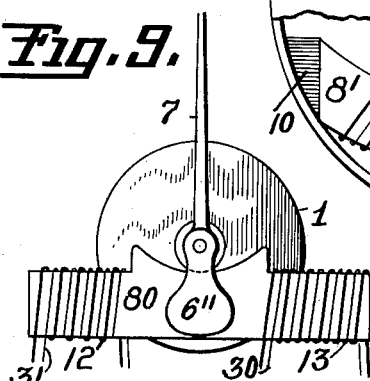
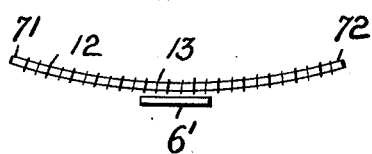
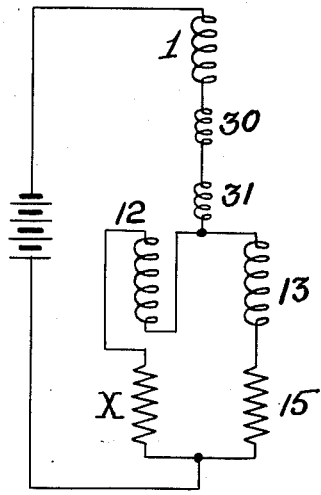
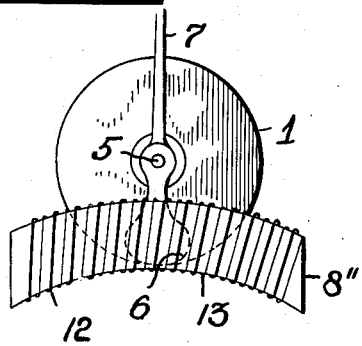
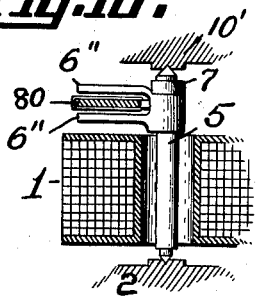
Inventor
HARRY L. TANNER.
By his Attorney
Herbert H. Thompson Patented June 1, 1926.

1,587,050

UNITED STATES PATENT OFFICE.

HARRY L. TANNER, OF BROOKLYN, NEW YORK.

ELECTRICAL INDICATOR.

Application filed April 13, 1922. Serial No. 552,077.

This invention relates to electrical measuring or indicating instruments and has especial adaptability to the measuring of resistance. The principal object of this invention is to devise an instrument of this character which possesses greater accuracy than the existing types, is substantially independent of variation in voltage in the line, and at the same time is simple and inexpensive in construction.

Referring to the drawings, in which what I now consider to be the preferred forms of my invention are shown:—

Fig. 6 is a view corresponding to Fig. 1 of another modification.

Figs. 7 and 8 illustrate two further slight modifications in the shape of the centralizing member of Fig. 1.

Fig. 9 shows a still different form of centralizing member having a different form of winding.

Fig. 10 is a transverse section of the same, the coils being omitted.

Fig. 11 is a wiring diagram of this form of the invention.

Figure 1:
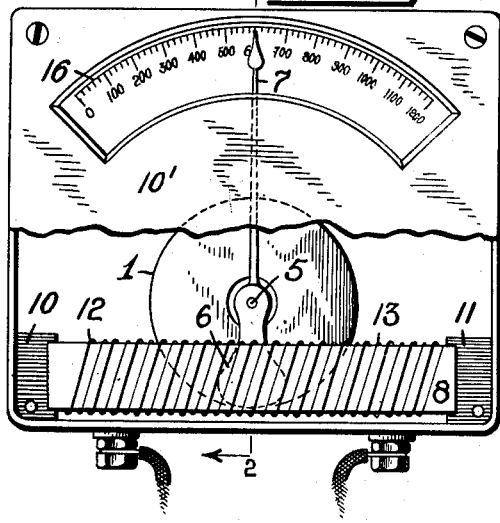
Fig. 1 is a plan view, with the cover partly broken away, of my improved ohmmeter.

The meter shown in Fig. 1 comprises essentially a hollow coil 1 suitably supported in a casing 2. Within said casing and preferably at the axis of said coil is a shaft 5 of magnetizable material, such as soft iron. On said shaft is mounted a laterally extending armature 6 of like material and an indicator 7, or pointer. Said armature and pointer are rotatably mounted about the axis of the coil, as by securing both to shaft 5 and pivotally mounting the latter between pivots 3, 4, in said casing.

With the construction so far described, it will be evident that the passing of a current through said coil will have no effect on said armature, since as much magnetic flux will pass around through shaft 5, armature 6, and back around through the air, with the armature in one position as another.

To localize the flux and thus centralize the armature, I provide a metallic bar 8, preferably of soft iron, positioned to one side of the axis of the coil and with its axis at an angle to the coil axis. With a straight bar such as shown in Fig. 1, armature 6 if symmetrical, would normally take up the position of Fig. 1. Said bar is shown as supported on brackets 10, 11 on said casing, being held in place by the top 10' when in place. About said bar is placed a coil of wire preferably in the form of a plurality of opposed windings 12, 13, i. e., windings which are connected so that current normally passes through them in opposite directions. It will be readily apparent, therefore, that if the ampere turns in the two coils 12, 13 are equal, that no magnetic field will be produced thereby, and that, therefore, armature 6 will remain in the position of Fig. 1. If, however, one coil is stronger than the other, the armature 6 will be displaced to a new resultant position under the influence of the fields produced by coil 1 and by the opposed windings, the amount of the displacement being a function of the difference in the strength of the current in the opposed windings.

Figure 2:
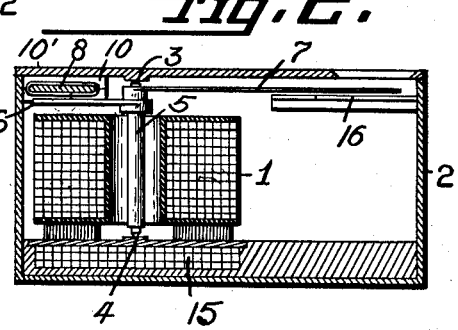
Fig. 2 is a vertical section of the same on line 2—2 of Fig. 1.
Figure 5:
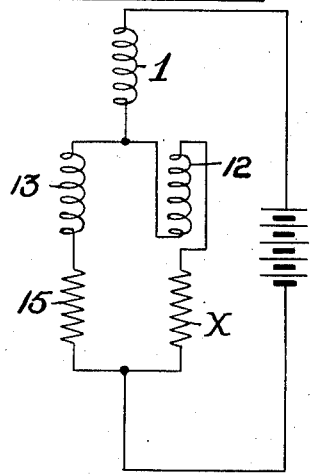
Fig. 5 is a wiring diagram of the meter.

Referring now to the wiring diagram of Fig. 5, X represents the unknown resistance which it is desired to measure. This it will be seen is connected in series with one of the opposed windings 12, both the resistance X and winding 12 being placed in parallel with coil 13 and (if desired), a known resistance 15, which may be mounted in the base of the instrument, (Fig. 2). Coil 1 on the other hand, is placed in series with the line. By this construction, the instrument is made wholly free from the effects of variation in line voltage, as any change in voltage will change equally the centralizing torque on armature 6 due to coil 1 and the decentralizing torque due to the difference in the action of coils 12 and 13.

The character of the scale 16 on which pointer 7 is readable may be varied by the design of the bar 8 and armature 6, and also by the relative resistance of the coil 13 with its resistance 15 to that of coil 12. For example, if armature 6 is symmetrical and coil 13 has a resistance of 50 ohms, and resistance 15, 150 ohms, and coil 12, 100 ohms, the central point on the scale 6 would be 100 ohms, assuming an equal number of ampere turns in coils 12 and 13.

If an open scale 16' (Fig. 6) at one end were desired, armature 6' may be made unsymmetrical so as to increase its movements in one direction. As shown in Fig. 6, the scale is open for higher readings thereof. A proper scale may also be arrived at by shaping the bar 8 in various ways. Thus, if a weak centralizing effect is desired, bar 8' may be curved toward the pin 5, (Fig. 6), but not about said pin as a center, as under this condition no centralizing would be secured. On the other hand, a greater centralizing effect may be secured by the opposite curving of said bar as shown at 8" in Fig. 8, or a similar effect may be secured by bending the ends, 71, 72 of the bar upwardly as roughly indicated in Fig. 7.

Figure 3:
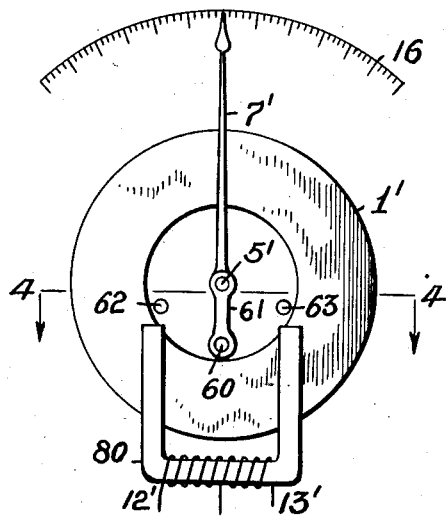
Fig. 3 is a diagrammatic plan view of a modified form of ohmmeter.
Figure 4:
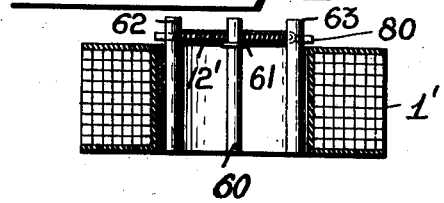
Fig. 4 is a section of the same on line 4—4 of Fig. 3.

A somewhat different method of applying the principles hereinbefore outlined is shown in Figs. 3 and 4. The three coils 1', 12' and 13' are retained and connected as shown in Fig. 5, but in place of armature 6, I employ a soft iron rod 60 secured to member 61 on shaft 5'. Said rod may extend downwardly through coil 1'. Also within said coil I fix a pair of spaced soft iron rods 62, 63. Coils 12' and 13' (which in this instance, is shown as a single winding with an intermediate tap), I place upon the U magnet 80.

The action of this device is very similar to that already described. When the coils 12' and 13' are of equal strength, the bar 60 will be equally repelled by the like poles of rods 62 and 63 and hence will remain centralized. As soon as one coil 12' or 13' becomes the stronger, however, the U magnet will weaken one bar 62 or 63 and strengthen the other, thereby causing proportional displacement of bar 60 and the attached pointer 7.

In Figs. 9, 10, and 11 are shown several variations in the manner of constructing the instrument. The centralizing bar 80 in this form has no windings at its center where the armature 6" is, the opposed windings 12 and 13 being slipped on the two ends. In this case also, I prefer to employ auxiliary windings 30, 31 on the ends, which are connected in series with coil 1 (Fig. 11) and each of which opposes the coil (12 or 13) with which it is interwound. By this means the strength of the decentralizing effect is increased. Also the armature 6" may be divided (Fig. 10) so as to extend to both sides of the bar 80, so as to cut a greater number of the lines of force.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:—

1. An ohmmeter comprising the combination with a known resistance, of a stationary coil, an armature rotatable about the axis thereof, a pair of coils adapted to carry current in opposite directions, a magnetic core for said pair of coils, said pair of coils having their axis at an angle to the axis of the first named coil, means for connecting the said coils and resistance with the unknown resistance so that the current passing through said first named coil divides into parallel circuits one of which includes the known resistance and one of said pair of coils and the other the unknown resistance and the other of said coils.

2. An electrical indicating instrument comprising a coil, an armature revoluble about the axis thereof, an indicator connected thereto, a bar of high permeability non-concentrically located with respect to the axis of said coil and adapted to centralize said armature and a winding on said bar.

3. An electrical measuring instrument comprising a coil, an armature revoluble about the axis thereof, an indicator connected thereto, and a soft iron member to one side of the axis of said coil for centralizing said armature and a winding on said member.

4. An electrical measuring instrument comprising a coil, an armature revoluble about the axis thereof, an indicator connected thereto, a soft iron member for centralizing said armature, a pair of opposed windings on said member, and means whereby current is passed through said windings in parallel and then through said first named coil.

5. An electrical measuring instrument comprising a coil member, an armature member, one of said members being revoluble about the axis of the coil, an indicator connected thereto, a soft iron member for centralizing said armature, a plurality of opposed windings for shifting the resultant field of force set up by said coil and windings to cause rotation of said indicator and means for inserting the resistance to be measured in circuit with one of said opposed windings.

6. An electrical measuring instrument comprising a coil, an indicator rotatable about the axis of said coil, a magnetic member mounted to rotate with said indicator about the axis thereof, means cooperating with said coil for centralizing said member in one position, and means for modifying the forces exerted by said first named means to cause rotation of said magnetic member to a new position.

7. An electrical measuring instrument comprising a coil, an armature rotatable about the axis of said coil, an indicator actuated thereby, means for localizing the magnetic flux created by said coil to centralize said armature, and a plurality of windings for setting up a field tending to shift the position of maximum flux to rotate said armature through an angle proportionate to the relative strength of the centralizing and decentralizing forces.

8. An electrical indicating instrument comprising a magnetizable rotatable member, an indicator actuated thereby, a coil for magnetizing said member, magnetic centralizing means adjacent said coil for said member and means for deflecting said member from its normal position.

9. An electrical indicating instrument comprising a magnetizable member, a coil member for magnetizing said member one of said members being rotatable, magnetic centralizing means to one side of said coil for said member and a second coil for deflecting said member from its normal position.

10. An electrical indicating instrument comprising a magnetizable rotatable member, a coil for magnetizing said member, magnetic centralizing means for said member adapted to localize the magnetic flux produced by said coil and a coil for deflecting the said member in either direction from its normal position.

11. In an ohmmeter, in combination, a coil member, an armature member, one of said members being rotatable about the axis of the coil, a soft iron member or the like, and a pair of opposed windings on said iron member, the soft iron member being mounted to one side of the axis of the coil.

In testimony whereof I have affixed my signature.

HARRY L. TANNER.